United States Patent [19]

Schindel

[11] 3,877,349
[45] Apr. 15, 1975

[54] DUAL OPPOSITE MOTION EXTENDING AND RETRACTING RAM FLUID CYLINDERS

[75] Inventor: Arnold Schindel, Fairlawn, N.J.
[73] Assignee: The Singer Company, Little Falls, N.J.
[22] Filed: May 15, 1974
[21] Appl. No.: 469,942

[52] U.S. Cl. .......................... 92/53; 92/75; 92/108; 92/113; 92/152
[51] Int. Cl. .............................................. F01b 7/20
[58] Field of Search ..... 92/51, 53, 61, 62, 65, 92/50, 69 R, 69 A, 75, 108, 107, 109, 113, 152

[56] References Cited
UNITED STATES PATENTS

| 2,358,826 | 9/1944 | Purat | 92/51 X |
| 2,551,246 | 5/1951 | D'Arcey | 92/61 X |
| 2,651,180 | 9/1953 | Haller | 92/61 X |
| 3,103,834 | 9/1963 | Neukom | 92/75 X |
| 3,814,194 | 6/1974 | Reich et al. | 92/75 X |

FOREIGN PATENTS OR APPLICATIONS
357,278  11/1961  Switzerland............................ 92/152

Primary Examiner—Martin P. Schwadron
Assistant Examiner—Abraham Hershkovitz
Attorney, Agent, or Firm—T. W. Kennedy

[57] ABSTRACT

A dual ram fluid cylinder having one ram at each end of the fluid cylinder and wherein the rams substantially simultaneously extend or retract in the same line and in opposite directions in response to selectively directed fluid flow and wherein the extended length is large compared to the retracted length. The fluid cylinder includes an outer housing; an inner housing coaxially located within the outer housing; an outer ram slideably disposed between the outer housing and the inner housing extending exteriorly in a first direction; a fluid transmission tube coaxially located within the inner housing; and an inner ram slideably disposed between the inner housing and the fluid transmission tube extending exteriorly in a second direction.

5 Claims, 5 Drawing Figures

3,877,349

PATENTED APR 15 1975

DUAL OPPOSITE MOTION EXTENDING AND RETRACTING RAM FLUID CYLINDERS

BACKGROUND OF THE INVENTION

1. Field of the Invention

The present invention relates to fluid cylinders having extending and retracting rams at each end of the body of the fluid cylinder.

2. Description of the Prior Art

Fluid cylinders are devices which are used to convert the energy stored in pressurized fluid into rectilinear mechanical motion. One form of fluid cylinder comprises a housing with a ram extends or retracts from the housing in response to pressurized flow. Usually the length of the ram approaches the length of the fluid cylinder housing. When extended, the overall extended length approaches twice the retracted length. Such fluid cylinders have found common usage in many types of machinery, including construction equipment, aircraft, and motor vehicles. One application of such fluid cylinders is to control the position of a driven element. Driven elements may include a mechanical linkage or a surface, such as an aircraft trim tab. Another application of fluid cylinders is the symmetrical and substantially simultaneous position control of two driven elements where the control or position froces must be in line and in opposite directions. The driven element may be two linkages or two surfaces. A fluid cylinder having extending and retracting rams at opposite ends of the cylinder, as disclosed herein, can be used for such applications.

SUMMARY OF THE INVENTION

A fluid cylinder having dual opposite motion rams wherein the rams extend or retract in the same line in accordance with the present invention includes a tubular outer housing; a tubular inner housing coaxially located within the outer housing; an outer piston having an extension face and a retraction face slideably disposed between the inside diameter of the outer housing and the outside diameter of the inner housing; a tubular outer ram affixed to the retraction face of the outer piston extending exteriorly in a first direction from one end of the fluid cylinder; a fluid transmission tube coaxially located within the inner housing; an inner piston having an extension face and a retraction face slideably disposed between the inside diameter of the inner housing and the outside diameter of the fluid transmission tube; a tubular inner ram affixed to the retraction face of the inner piston extending exteriorly in a second direction from the other end of the fluid cylinder; a retainer which retains the inner piston in the fluid cylinder; and a plurality of ports, passages, and openings which simultaneously direct fluid pressrue against either the retraction faces or the extension faces of the inner and outer rams and cause the inner and outer rams to substantially simultaneously extend or retract from the body of the fluid cylinder.

BRIEF DESCRIPTION OF THE DRAWINGS

The present invention will be fully understood from consideration of the following detailed description taken in conjunction with the accompanying drawings, in which like referenced characters refer to the like parts in the several views, and wherein.

DESCRIPTION OF THE PREFERRED EMBODIMENT

Figure 1:
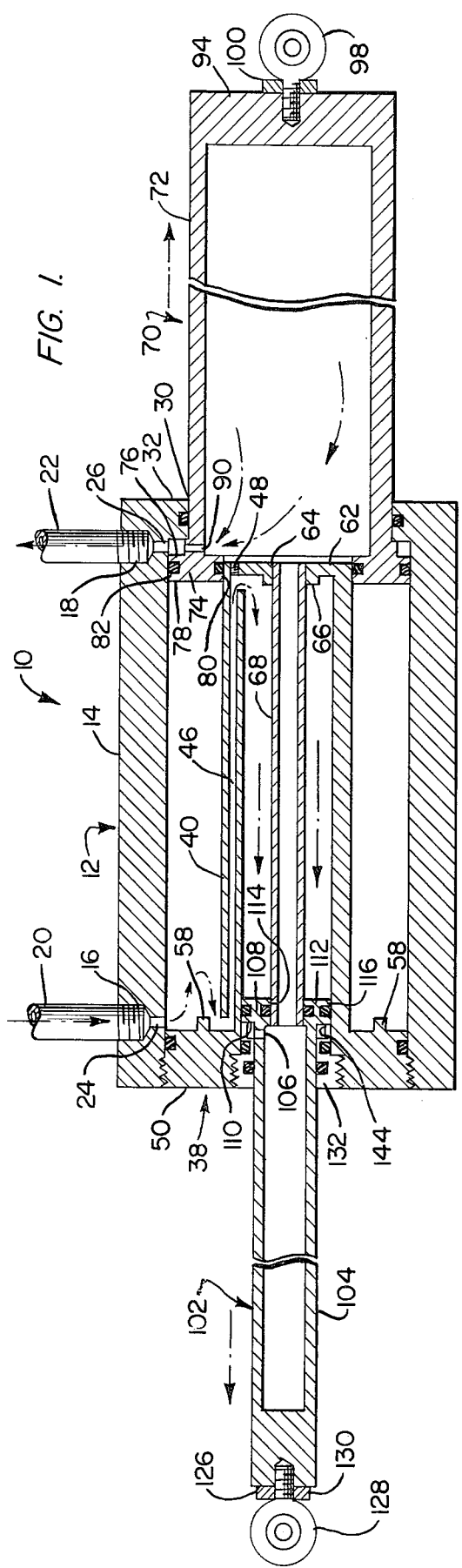
FIG. 1 is a longitudinal cross sectional view of a preferred embodiment of the present invention showing the two rams in extended position.

As shown in the accompanying drawings, a fluid cylinder in accordance with the present invention is generally designated by the numeral 10 and includes an outer housing generally designated by the numeral 12, an inner housing generally designated by the numeral 38, a fluid transmission tube 68, an outer ram generally designated by the numeral 70, an inner ram generally designated by the numberal 102, and a retainer generally designated by the numeral 132.

The outer housing 12 has a tubular portion 14. A fluid port 16 is located near a first end of the tubular portion 14 and a fluid port 18 is located near the second end. A fluid transmission means 20 is in threaded engagement with the fluid port 16 and a fluid transmission means 22 is in threaded engagement with the fluid port 18. A fluid passage 24 is located near the first end of the outer housing 12 and extends through the wall of the outer housing 12 from the fluid port 16 to the inner surface of the outer housing 12. A fluid passage 26 is located near the second end of the outer housing 12 and extends through the wall from the fluid port 18 to the inner surface of the outer housing 12. The fluid transmission means 20, the fluid port 16, and the fluid passage 24 allow for the free flow of fluid into or out of the first end of the outer housing 12. The fluid transmission means 22, the fluid port 18, and the fluid passage 26 allow for the free flow of fluid into or out of the second end of the outer housing 12. Threads are located on the inside diameter at the first end of the outer housing 12 for threaded engagement with the inner housing 38 as will be described below. A central opening 30 defined by a radially inward extending flange 32 is located at the second end of the outer housing 12. As can best be seen in FIG. 2, a recess 34 is located on the periphery of the inside diameter of the central opening 30. An elastic sealing ring 36 is located within the recess 34.

An inner housing generally designated by the numeral 38 includes a tubular portion 40. A radially outward extending flange 50 is located at the first end of the inner housing 38. Threads are located on the outside diameter of the flange 50 for threaded engagement with the first end of the outer housing 12. As can best be seen in FIG. 2, a recess 54 is located on the periphery of the outside diameter of the flange 50. An elastic ring 56 is located within the recess 54. A stop 58 having an annular shape is located on the wall of flange 50 and acts as a mechanical stop to limit travel of the outer ram 70 as will be described below. The stop 58 is periodically interrupted (not shown) to allow free fluid flow from one side to the other side.

Figure 2:
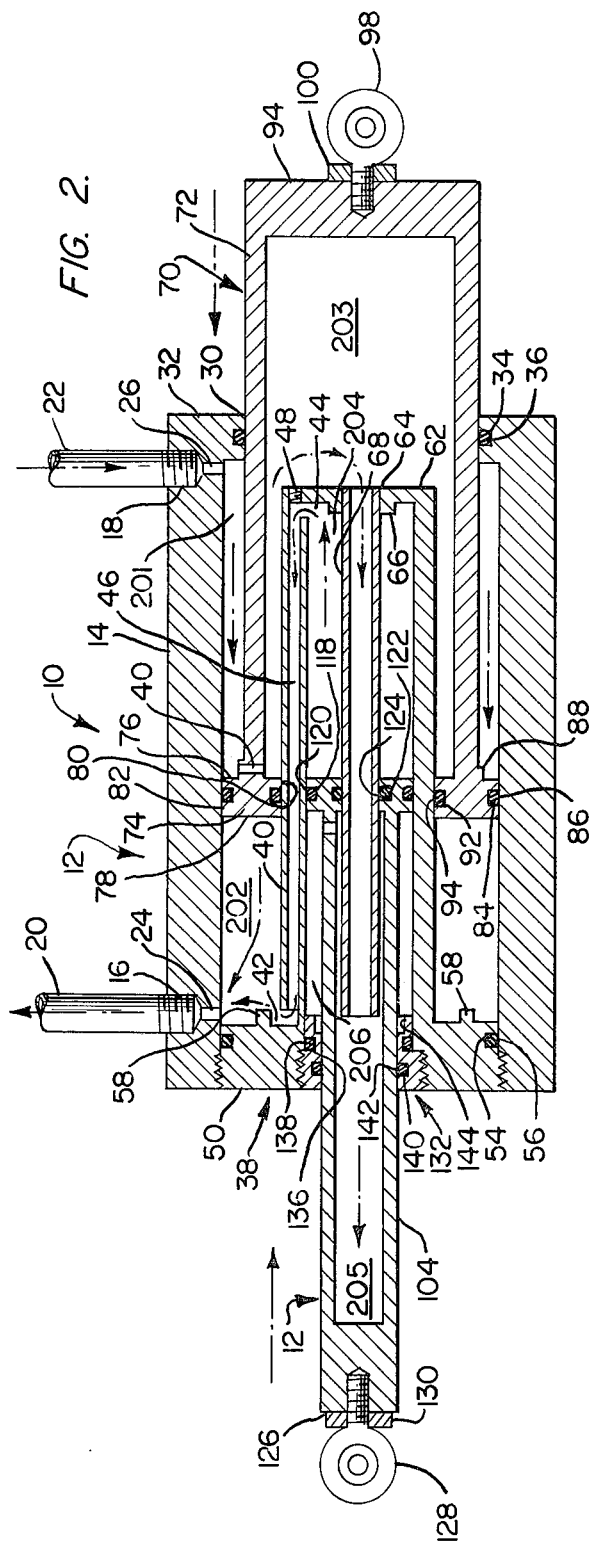
FIG. 2 is a longitudinal cross sectional view similar to FIG. 1 showing the two rams in partially extended position.
Figure 3:
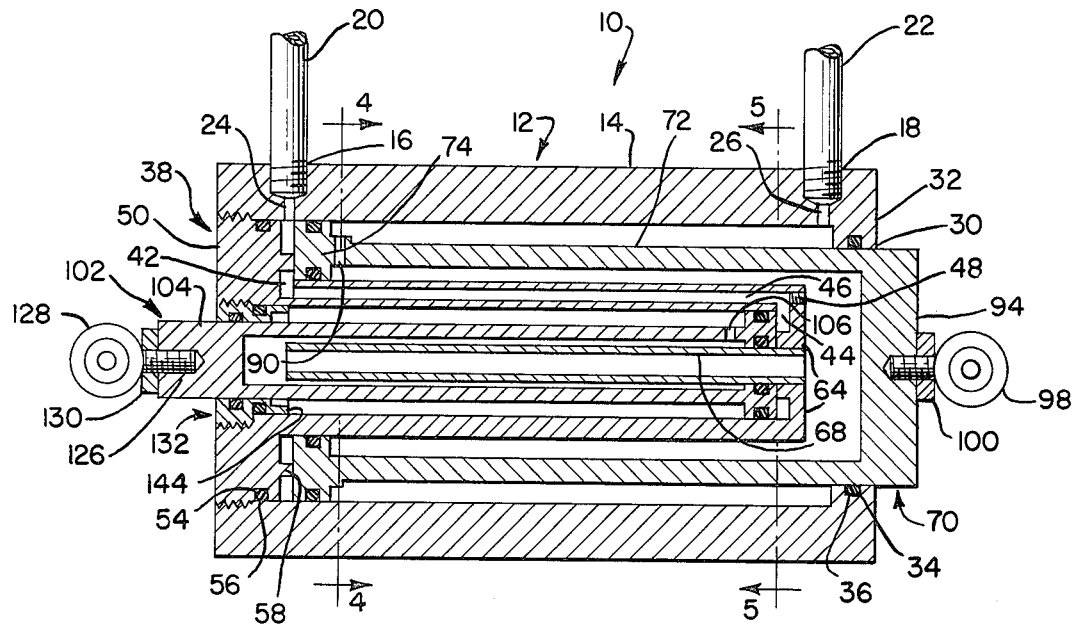
FIG. 3 is a longitudinal cross sectional view similar to FIG. 1 showing the two rams in retracted position.
Figure 4:
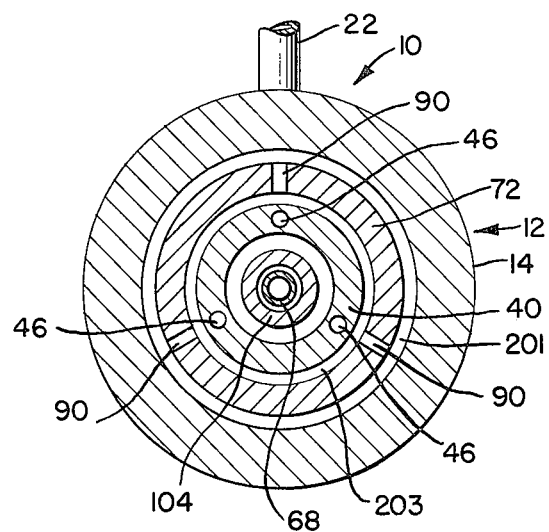
FIG. 4 is a cross sectional view of the apparatus shown in FIG. 3 taken along the line 4—4.
Figure 5:
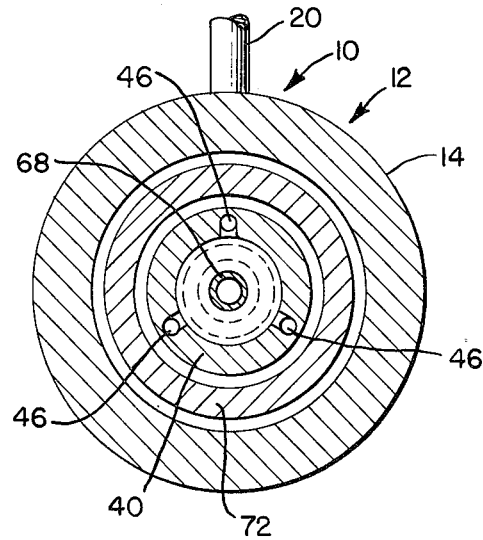
FIG. 5 is a cross sectional view of the apparatus shown in FIG. 3 taken along the line 5—5.

An can best be seen in FIG. 2, at least one, and preferably a plurality of equally circumferentially spaced fluid openings 42 are located on the outside diameter of the tubular portion 40 of the inner housing 38 at the juncture of the tubular portion 40 and the flange 50. At least one, and preferably a plurality of equally circumferentially spaced fluid openings 44 are located on the inside diameter of the tubuar portion 40 at the second end of the inner housing 38. The fluid passages 46 are longitudinally disposed within the wall section of the tubular portion 40 and extend from the fluid openings 42 to the fluid openings 44. The fluid passages 46 may be formed by any number of well known means. When the fluid passages 46 are formed by drilling, the plugs 48 are used to fluid sealably block the drill access holes. Threads are located on the inside diameter of the first end of the tubular portion 40 for threaded engagement with the retainer 132 as will be described below.

A radially inward extending section 62 is located at the second end of the tubular portion 40 and defines an orifice 64. A stop 66 projects from around orifice 64 and acts to limit the travel of the inner ram 102, as will be described below. A fluid transmission tube 68 having a tubular cross section is fluid sealably fitted into the orifice 64 and extends coaxially toward the first end of the tubular portion 40 of the inner housing 38. The fluid transmission tube 68 may be fitted to the orifice 64 by any number of well known ways including circumferential mechanical fit or by welding.

The outer housing 12 receives the inner housing 38 through the open first end of the outer housing 12. The flange 50 of the inner housing 38 is in threaded engagement with the inside diameter of the first end of the outer housing 12. The tubular portion 40 of the inner housing 38 coaxially extends into the interior of the outer housing 12. The recess 54 located on the outside diameter of the flange 50 of the inner housing 38 and the elastic sealing ring 56 located therein form a static fluid seal between the outside diameter of the flange 50 of the inner housing 38 and the inside diameter of the outer housing 12. The flange 50 maintains the tubular portion 14 of the outer housing 12 and the tubular portion 40 in a spaced apart relation.

The outer ram 70 is disposed between the inside diameter of the outer housing 12 and the outside diameter of the inner housing 38.

The outer ram 70 has a tubular portion 72 and an outer piston 74 extending radially inward and outward at one end. The outer piston 74 includes a retraction face 76, located at the junction of the outer piston 74 and the tubular portion 72; an extension face 78 opposite the flange 50 of the inner housing 38; an inner side wall 80 opposite the inside diameter of the tubular portion 40 of the inner housing 38; and and outer side wall 82 opposite the inside diameter of the tubular portion 14 of the outer housing 12. As can best be seen in FIG. 2, a recess 84 is located on the periphery of the outer side wall 82 and an elastic sealing ring 86 located therein forms a dynamic fluid seal between the inside diameter of the tubular portion 14 and the outer side wall 82. A stop 88 is located at the junction of the retraction face 76 and the tubular portion 72. The stop 88 acts to limit travel of the outer ram 70 as will be described below.

At least one, and preferably a plurality of equally circumferentially spaced fluid passages 90 are located in the wall of the outer ram 70 near the retraction face 76. The fluid passages 90 extend through the wall of the outer ram 70, and allow free fluid flow from one side of the wall to the outer side of the wall. As can best be seen in FIG. 2, a recess 92 is located on the periphery of the inner side wall 80 and an elasticc sealing ring 94 located therein forms a dynamic fluid seal between the inner side wall 80 and the outside diameter of the tubular portion 40 of the inner housing 38. The outer ram 70 extends exteriorly in a first direction from the retraction face 76 of the outer piston 74 through the central opening 30 of the outer housing 12. The recess 34 located on the inside diameter of the central opening 30 of the outer housing 12 and the elastic sealinig ring 36 located therein forms a dynamic fluid seal between the inside diameter of the central opening 30 of the outer housing 12 and the outer ram 70. The exterior end 94 of the outer ram 70 is closed. The outer ram 70 is operably coupled to the driven element (not shown) by any number of well known means including the tie rod end 98 and the lock nut 100.

The inner ram 102 is disposed between the inside diameter of the tubular portion 40 of the inner housing 38 and the outside diameter of the fluid transmission tube 68.

The inner ram 102 has a tubular portion 104 and an inner piston 108 extending radially inward and outward at one end. The inner piston 108 includes a retraction face 110 located at the junction of the inner piston 108 and the tubular portion 104 of the inner ram 102; an extension face 112 opposite section 62 of the inner housing 38, an inner side wall 114 opposite the outside diameter of the fluid transmission tube 68, and an outer side wall 116 opposite the inside diameter of the tubular portion 40 of the inner housing 38. As can best be seen in FIG. 2, a recess 118 is located on the periphery of the outer side wall 116 of the inner piston 108. An elastic sealing ring 120 located within the recess 118 forms a dynamic fluid seal between the outer side wall 116 of the inner piston 108 and the inside diameter of the inner housing 38. A recess 122 is located on the periphery of the inner side wall 114 of the inner piston 108. An elastic sealing ring 124 located within the recess 122 forms a dynamic fluid seal between the inner side wall 114 and the outside diameter of the fluid transmission tube 68. At least one and preferably a plurality of equally circumferentially spaced fluid passages 106 are located at the juncture of the retraction face 110 of the inner piston 108 and the tubular portion 104 of the inner ram 102. The fluid passages 106 extend through the wall of the inner ram 102 and allow free fluid flow through the wall. The inner ram 102 extends exteriorly in a second direction from the retraction face 110 through the open first end of the inner housing 38. The exterior end 126 of the inner ram 102 is closed. The inner ram 102 is operably coupled to the driven element (not shown) by any number of well known means such as a tie rod end 128 and a lock nut 130.

A retainer 132 having an annular cross section is in threaded engagement with the inside diameter of the open first end of the inner housing 38. As can best be seeen in FIG. 2, a recess 136 is located on the periphery of the outside diameter of the retainer 132. An elastic sealing ring 138 located within the recess 136 forms a static fluid seal between the outside diameter of the retainer 132 and the inside diameter 40 of the inner housing 38. A recess 140 is located on the periphery of the inside diameter of the retainer 132. An elastic sealing ring 142 located within the recess 140 forms a dynamic fluid seal between the inside diameter of the retainer 132 and the outside diameter of the inner ram 103. A stop 144 extends from the inerior wall of the retainer 132 and acts to limit travel of the inner ram 102 as will be described below.

As can best be seen in FIG. 2, the outer housing 12, the outer ram 70, the inner housing 38, the inner ram 102, and the retainer 132 define six chambers; a first chamber 201, a second chamber 202, a third chamber 203, a fourth chamber 204, a fifth chamber 205, and a sixth chamber 206. The chamber 201 is defined by the inside diameter of the tubular portion 14 of the outer housing 12, the outside diameter of the tubular portion 72 of the outer ram 70, the interior wall of the central opening 30 and the radially outward extending portion of the retraction face 76. The chamber 202 is defined by the inside diameter of the tubular portion 14 of the outer housing 12, the outside diameter of the tubular portion 72 of the outer ram 70, the interior wall of the central opening 30 and the radially outward extending portion of the retraction face 76. The chamber 202 is defined by the inside diameter of the tubular portion 14 of the outer housing 12, the outside diameter of the tubular portion 40 of the inner housing 38, the interior wall of the flange 50 and the extension face 78. The chamber 203 is defined by the inside diameter of the tubular portion 40 of the inner housing 38, the closed exterior end 96 of the outer ram 70, the radially inward extending portion of the retraction face 76 and the section 62. The chamber 204 is defined by the inside diameter of the tubular portion 40 of the inner housing 38, the outside diameter of the fluid transmission tube 68, the section 62 and the extension face 112. The chamber 205 is defined by the inside diameter of the tubular portion 104 of the inner ram 102, the outside diameter of the fluid transmission tube 68, the closed exterior end 126 of the inner ram 102, and the radially inward extending portion of the retraction face 110. The chamber 206 is defined by the inside diameter of the tubular portion 40 of the inner housing 38, the outside diameter of the tubular portion 104 of the inner ram 102, the interior wall of the retainer 132 and the radially outward extending portion of the retraction face 110.

A retraction fluid path and an extension fluid path are defined by the various fluid transmission means, the fluid ports, the fluid passages, the fluid openings, the chambers, the fluid transmission tube 68, the outer housing 12, the inner housing 38, the outer ram 70, the inner ram 102, and the retainer 132. The retraction fluid path is formed by the fluid transmission means 22, the fluid port 18, the fluid passage 26, the chamber 201, the fluid passages 90, the chamber 203, the outer ram 64, the fluid transmission tube 68, the chamber 205, the fluid passages 106, and the chamber 206. The extension fluid path is formed by the fluid transmission means 20, the fluid port 16, the fluid passage 24, the chamber 202, the fluid openings 42, the fluid passages 46, the fluid openings 44 and the chamber 204.

In order to retract, fluid pressure is applied to the retraction fluid path and the extension fluid path is left unpressurized. The fluid pressure is applied to the retraction fluid path through the fluid transmission means 22, through the fluid port 18, through the fluid passage 26, into the chamber 201 where the fluid pressure is applied against the radially outward extending portion of the retraction face 76 of the outer piston 74, through the fluid passages 90 into the chamber 203 where the fluid pressure is applied against the radially inward extending portion of the retraction face 76 of the outer piston 74 through the orifice 64, into and through the fluid transmission tube 68, into the chamber 205 where the fluid pressure is applied against the radially inward extending portion of the retraction face 110 of the inner piston 108, through the fluid passages 106 into the chamber 206 where the fluid pressure is applied against the radially outward extending portion of the retraction face 110. The fluid pressure applied against the retraction face 76 and the retraction face 110 causes the inner ram 102 and the outer ram 70 to retract inwardly into the body of the fluid cylinder. During retraction, the volume of the unpressurized chamber 202, and the chamber 204, both of the extension fluid path, decreases because of the inward movement of the inner ram 102 and the outer ram 70. Fluid contained within the chamber 202 and the chamber 204 is expelled from the fluid cylinder 10 through the extension fluid path. Fluid contained in the chamber 204 during retraction is expelled through the fluid openings 44, into and through the fluid passages 46, through the fluid openings 42, into the chamber 202 where the fluid being expelled from the chamber 204 joins the fluid being expelled from the chamber 202. The fluid from both the chamber 202 and the chamber 204 is then expelled through fluid passage 24, the fluid port 16, and the fluid transmission means 20 through appropriate well known valving (not shown) into a sump or reservoir (not shown), or in the case where the fluid is air, into the atmosphere.

The inward retraction of the outer ram 70 continues until the extension face 78 contacts the stop 58. As previously mentioned, the stop 58 is periodically interrupted to allow free fluid flow of the exhausting fluid from one side to the other side. The inward retraction of the inner ram 102 continues until the extension face 112 contacts the stop 66.

In order for the retraction to take place, a net inward force must be applied to the inner ram 102 and the outer ram 70 by the fluid in the retraction fluid path. The necessary inward force will occur for the outer ram 70 when the inward force produced by the fluid pressure in the retraction fluid path acting against the area of the retraction face 76 of the outer piston 74 is greater than the outward force produced by the fluid pressure, if any, in the extension fluid path acting against the area of the extension face 76 plus the outer ram 70 sliding friction forces. The necessary inward force will occur for the inner ram 102 when the inward forces produced by the fluid pressure in retraction fluid path acting against the area of the retraction face 110 of the inner piston 108 is greater than the outward forces produced by the fluid pressure, if any, in the extension fluid path acting against the area of the extension face 112 plus the sliding friction force of the inner ram 102.

In order to extend, fluid pressure is applied to the extension fluid path and the retraction fluid path is left unpressurized. The fluid pressure is applied to the extension fluid path through the fluid transmission means 20 through the fluid port 16, through the fluid passage 24, into the chamber 202 where the fluid pressure is applied against the extension face 78 of the outer ram 70, through the fluid openings 42, through the fluid passages 46, through the fluid openings 44, into the chamber 204 where the fluid pressure is applied against the extension face 112 of the inner ram 102. The fluid pressure applied against the extension face 78 and the extension face 112 causes the outer ram 70 and the inner ram 102 to extend outwardly of the body of the fluid cylinder 10.

In order for outward extension to take place, a net outward force must be applied to the inner ram 102 and the outer ram 70. The necessary outward force will occur for the outer ram 70 when the outward forces produced by the fluid pressure in the extension fluid path acting against the area of the extension face 78 is greater than the inward forces produced by the fluid pressure, if any, in the retraction fluid path acting against the area of the retraction face 76 plus the outer ram sliding friction force. The necessary outward force will occur for the inner ram 102 when the outward force produced by the fluid pressure in the extension fluid path acting against the area of the extension face 112 is greater than the inward forces produced by the fluid pressure, if any, in the retraction fluid path acting against the retraction face 110 plus the sliding friction force of the inner ram 102.

During extension, the outward movement of the outer piston 74 causes the volume of the chamber 201 to decrease, and the volume of the chamber 203 to increase; and the outward movement of the inner piston 108 causes the volume of the chamber 206 to decrease, and the volume of the chamber 205 to increase. Depending on the net change in volume of the chamber 201, the chamber 203, the chamber 205, and the chamber 206, the volume of the fluid contained in the retraction fluid path during extension may remain constant, increase through fluid injection, or decrease through fluid expulsion. The amount of volume increase of the chamber 203 and the chamber 205 and the amount of volume decrease for the chamber 203 and the chamber 205 depends upon the design dimentions of the fluid cylinder 10.

In the case where the combined volume increase of the chamber 203 and the chamber 205 is substantially equal to the combined volume decrease of the chamber 201 and the chamber 206, no fluid will be injested into or expelled from the fluid cylinder 10 through the retraction fluid path. However, fluid will be transferred from the chamber 203 to the chamber 201 through the fluid passages 90 and fluid will be transferred from the chamber 206 to the chamber 205 through the passages 106.

In the case where the combined volume increase of the chamber 203 and the chamber 205 is less than the combined volume decrease of the chamber 201 and the chamber 206, there will be a net decrease in the volume of the retraction fluid path and fluid will be expelled from the fluid cylinder 10 through the retraction fluid path. The outward moving retraction face 110 of the inner ram 102 will expel fluid from the chamber 201 through the fluid passages 90 into the chamber 203. Fluid being expelled from the chamber 201 into the chamber 203 in excess of the volume increase needs of the chamber 203 will be expelled from the fluid cylinder 10 through the fluid passage 26, the fluid port 18, and the fluid transmission means 22.

In the case where the combined volume increase of the chamber 203 and the chamber 205 is greater than the combined volume decrease of the chamber 201 and the chamber 206, there will be a net increase in the volume of the retraction fluid path and fluid will be injested into the fluid cylinder 10 through the retraction fluid path. The outward moving retraction face 110 of the inner ram 102 will expel fluid from the chamber 206 through the fluid passages 106 into the chamber 205 where the fluid being expelled from the chamber 206 will partially fill the increasing volume of the chamber 205. The remainder of the increased volume need of the chamber 205 will be drawn from chamber 203 through fluid transmission tube 68. Substantially simultaneously with the outward movement of the retraction face 110, the outward moving retraction face 76 will expel fluid from the chamber 201 through the fluid passages 90 into the chamber 203 where the fluid being expelled from the chamber 201 will partially fill the increasing volume of the chamber 203. The remainder of the increased volume needs of the chamber 203 will be drawn into the fluid cylinder through the fluid passage 26, the fluid port 18, and the fluid transmission means 22.

What has been described herein is a fluid cylinder in accordance with the present invention suitable for applications requiring dual opposite motion in line rams. Illustrative of one such application is the position control of two trim tabs on the tail fin of an aircraft.

As will be apparent to those skilled in the art, various changes and modifications may be made to the fluid cylinder described herein without departing from the scope and spirit of the present invention.

What is claimed is:

1. A fluid cylinder comprising:
   an outer housing including a tubular portion having an open first end and a radially inward extending flange defining a central opening at the second end thereof;
   an inner housing including a tubular portion having a flange at a first end thereof for engagement with the open first end of the tubular portion of the outer housing,
   the tubular portion of the inner housing extending from the flange into the interior of the outer housing,
   the flange on the inner housing maintaining the tubular portion of the inner housing and the tubular portion of the outer housing in a spaced relation, and
   a section extending radially inward at the second end of the tubular portion of the inner housing defining an orifice;
   a fluid transmission tube extending from the orifice toward the first end of the tubular portion of the inner housing with the radially inward extending section of the inner housing maintaining the fluid transmission tube and the tubular portion of the inner housing in a spaced relation;
   an outer ram having an annular piston portion slideably disposed between the outside diameter of the tubular portion of the inner housing and the inside diameter of the tubular portion of the outer housing, and
   a tubular portion extending from the piston exteriorly in a first direction through the central opening at said second end of the outer housing and terminating in a closed exterior end, the outer ram dividing the space between the inner housing and the outer housing into a first chamber, a second chamber, and a third chamber;

an inner ram having an annular piston portion slideably disposed between the inside diameter of the tubular portion of the inner housing and the outside diameter of the fluid transmission tube, and a tubular portion extending from the piston of the inner ram exteriorly in a second direction and terminating in a closed exterior end, the inner ram dividing the space between the fluid transmission tube and the inner housing into a fourth chamber, a fifth chamber, and a sixth chamber;

an extension fluid path means for fluidly coupling the second chamber and the fourth chamber with an external pressurized fluid flow; and a retraction fluid path means for fluidly coupling the first chamber, the third chamber, the fifth chamber, and the sixth chamber with the external pressurized fluid flow.

2. The fluid cylinder as claimed in claim 1, in which the extension fluid path means includes at least one fluid passage extending from near the first end of the inner housing to the second end of the inner housing to fluidly couple the second and the fourth chamber.

3. The fluid cylinder as claimed in claim 1, in which the retraction fluid path means includes at least one fluid passage in the outer ram to fluidly couple the first and the third chamber, the fluid transmission tube fluidly coupling the third and the fifth chamber, and at least one fluid passage in the inner ram fluidly coupling the fifth and the sixth chamber.

4. The fluid cylinder as claimed in claim 2, in which the retraction fluid path means includes at least one fluid passage in the outer ram to fluidly couple the first and the third chamber, the fluid transmission tube fluidly coupling the third and the fifth chamber, and at lease one fluid passage in the inner ram fluidly coupling the fifth and the sixth chamber.

5. The fluid cylinder as claimed in claim 1, in which the flange at the first end of the tubular portion of the inner housing includes a radially inward extending portion thereof which surrounds the outside diameter of the tubular portion of the inner ram.

* * * * *